A. O., A. A. & G. M. BENSON, H. K. SOLBERG & C. H. FLICK.
AUTOMOBILE SPEED SIGNAL.
APPLICATION FILED MAR. 10, 1915.
1,204,539.
Patented Nov. 14, 1916.
3 SHEETS—SHEET 1.
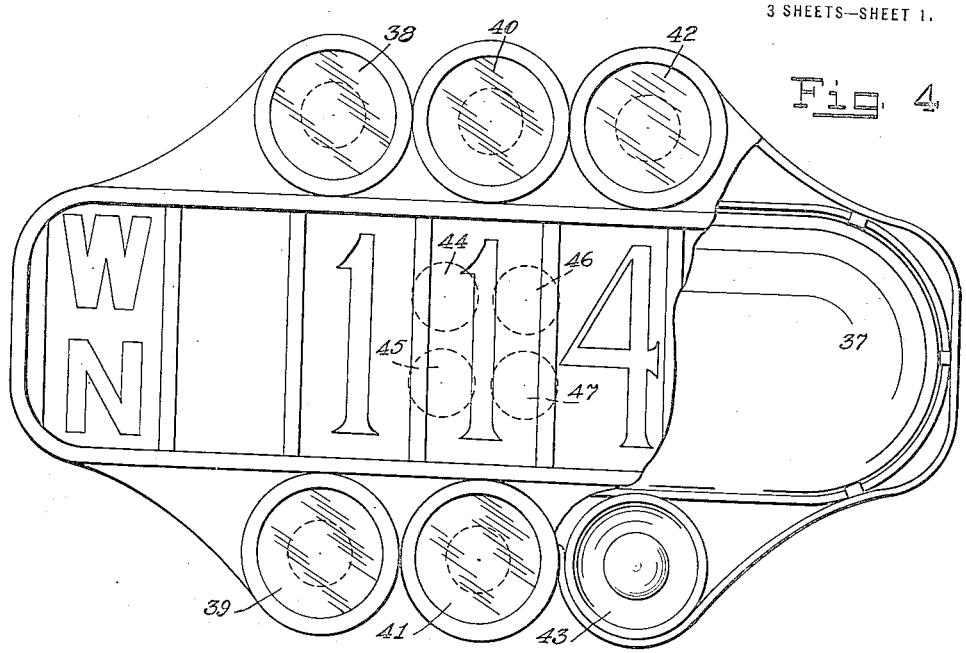
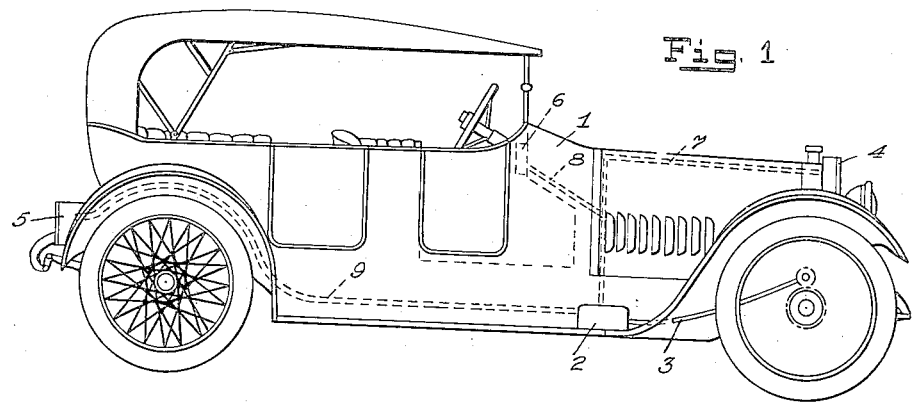
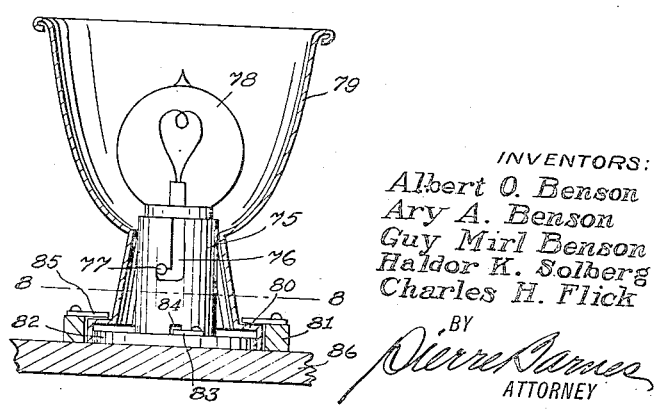
WITNESSES:
Charles Lane Reynolds.
F. C. Matheny
INVENTORS:
Albert O. Benson
Ary A. Benson
Guy Mirl Benson
Haldor K. Solberg
Charles H. Flick
BY Pierre James
ATTORNEY A. O., A. A. & G. M. BENSON, H. K. SOLBERG & C. H. FLICK.
AUTOMOBILE SPEED SIGNAL.
APPLICATION FILED MAR. 10, 1915.

1,204,539.

Patented Nov. 14, 1916.

WITNESSES:
Charles Lane Reynolds.
F. C. Matheny

INVENTORS:
Albert O. Benson
Ary A. Benson
Guy Mirl Benson
Haldor K. Solberg
Charles H. Flick
BY
Pierre Barnes
ATTORNEY

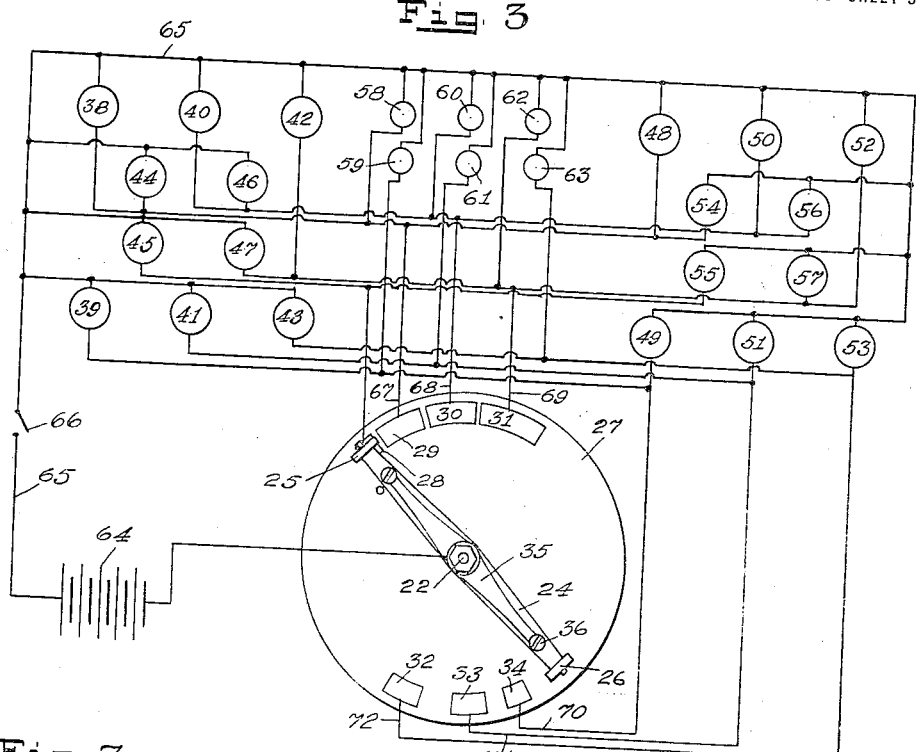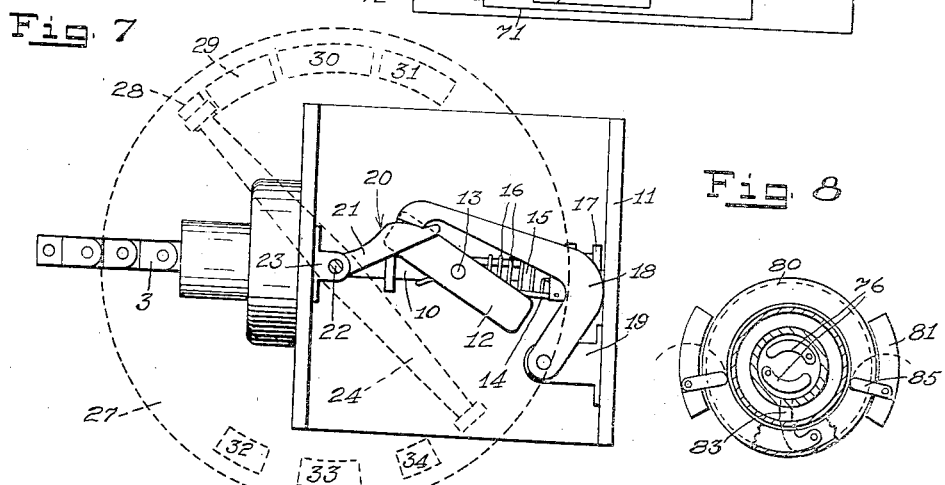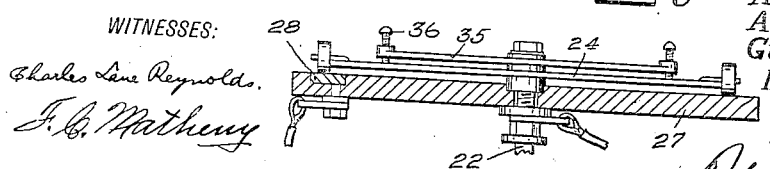

UNITED STATES PATENT OFFICE.

ALBERT O. BENSON, ARY A. BENSON, GUY MIRL BENSON, AND HALDOR K. SOLBERG, OF SEATTLE, AND CHARLES H. FLICK, OF ELLENSBURG, WASHINGTON, ASSIGNORS TO BENSON, FLICK & SOLBERG, INC., OF SEATTLE, WASHINGTON, A CORPORATION OF WASHINGTON.

AUTOMOBILE SPEED-SIGNAL.

1,204,539.     Specification of Letters Patent.     Patented Nov. 14, 1916.

Application filed March 10, 1915. Serial No. 13,539.

*To all whom it may concern:*

Be it known that we, ALBERT O. BENSON, ARY A. BENSON, GUY MIRL BENSON, and HALDOR K. SOLBERG, citizens of the United States, residing at Seattle, in the county of King and State of Washington, and CHARLES H. FLICK, residing at Ellensburg, in the county of Kittitas and State of Washington, have invented certain new and useful Improvements in Automobile Speed-Signals, of which the following is a specification.

Our invention relates to improvements in signaling devices and, more particularly, to improvements in speed indicating devices for motor vehicles, and the object of our improvement is to provide an efficient and reliable speed-indicating device comprising a plurality of luminous signals, together with mechanism that will cause such signals to be illuminated one after the other as certain predetermined rates of speed are reached or exceeded, such signals being visible to the driver of the vehicle and also to persons outside of such vehicle, as to traffic officers along the route of travel of such vehicle.

The following description is, for convenience, limited to the use of the invention in connection with an automobile with the understanding, however, that said invention may be used in whole or in part in connection with other vehicles or with moving mechanism of any form.

Figure 2:
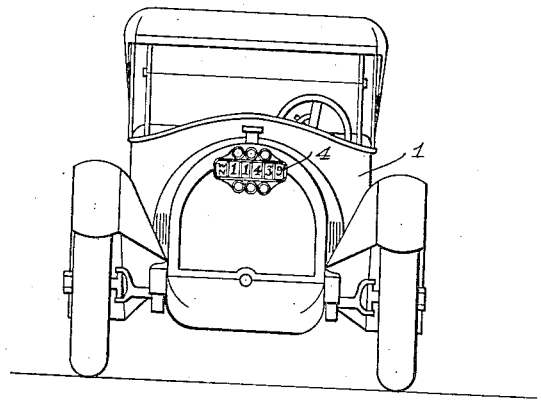
Figure 6:
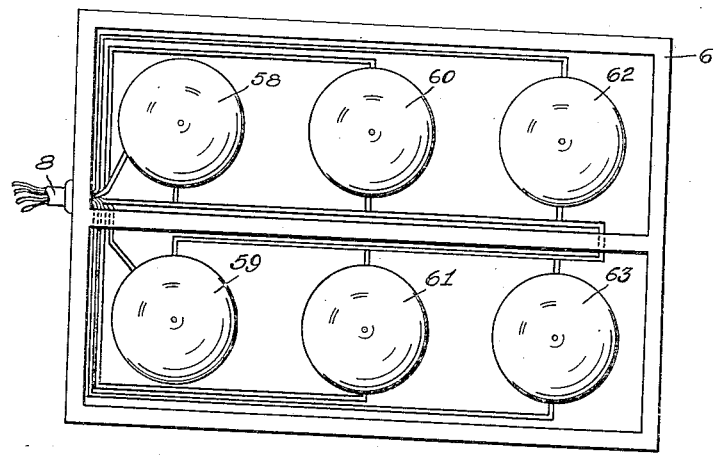

In the drawings, Figure 1 is a view in side elevation of a motor car upon which our invention has been installed; Fig. 2 is a view in front elevation of the same; Fig. 3 is a diagrammatic view of electrical apparatus embodied in our invention, together with certain mechanical parts; Fig. 4 is a plan view of a signal box, certain portions being broken away to illustrate certain other portions more clearly; Fig. 5 is a view in cross section of a lamp and parts associated therewith; Fig. 6 is a plan view, with the cover removed, of a speed-indicator that is located within sight of the driver; Fig. 7 is a plan view of a portion of the actuating mechanism, the position of certain parts being indicated by broken lines; Fig. 8 is a view in cross section on broken line 8—8 of Fig. 5; and Fig. 9 is an enlarged view in cross section of a speedometer dial embodied in our invention, certain associated parts being shown in elevation.

Referring to the drawings throughout which like reference numerals indicate like parts, 1 is a motor car with which our speed-indicating device is associated, and 2 is a casing within which the actuating mechanism of such device is contained, such actuating mechanism being connected by a flexible shaft 3 and suitable speedometer gearing of well-known form, shown by broken lines in Fig. 1, with the front wheel of the car 1 in the usual manner.

4 is a signal box that is secured to the front end of the car 1 in a position where it may be easily seen by persons along the route of travel of such car, 5 is a similar signal box secured to the rear end of the car in a conspicuous location and 6, illustrated by broken lines in Fig. 1, is a slightly different form of signal box that is secured within the front portion of the car where it may be easily seen by the driver at all times.

The signal boxes 4, 5 and 6 are connected with switch mechanism disposed in the casing 2 by electric circuit wires hereinafter described, such circuit wires being disposed within suitable conduits 7, 8 and 9 respectively, which are shown by broken lines in Fig. 1.

Within the casing 2 is provided speed-indicating mechanism of a well-known form, consisting of a shaft 10 that is journaled in a frame 11 and is connected with the flexible shaft 3 whereby it may be rotated, such shaft 10 having a disk 12 of heavy material pivotally secured thereon by a pin 13, which disk is connected by a link 14 with a sleeve 15 that is slidably mounted on the shaft 10 and is pressed outwardly by a spring 16 to cause said sleeve 15 and disk 12 to assume the positions shown in Fig. 7 when the shaft 10 is at rest.

The sleeve 15 is provided with a grooved shifting collar 17 that is engaged by a shifting arm (not shown) connected with a bell-crank shaped member 18 which is pivoted at one end to a bracket 19 and adapted to have its other end bear against a peculiarly shaped cam surface 20 on a spring-pressed arm 21 that is secured to a shaft 22, journaled in suitable bearing brackets 23 and rigidly connected with a cross arm 24 upon the ends of which are provided rollers 25 and 26 that are adapted to roll upon a dial 27, as more clearly shown in Figs. 3 and 9. The dial 27 is constructed of insulating material and is provided with electrical contact members 28, 29, 30, 31, 32, 33 and 34 over which the rollers 25 and 26 are adapted to roll to close different electrical circuits.

A short cross arm 35 is mounted on the shaft 22 above the cross arm 24 and is provided with screws 36 in both ends thereof which screws are adapted to be screwed with varying force against the arm 24 to increase or decrease the pressure of the rollers 25 and 26 on the dial 27.

In Fig. 4 we shave shown a plan view of the signal box 5 that is associated with the rear of the car 1, such box comprising a compartment 37 for the registration number of the car and having a plurality of colored lamps 38, 39, 40, 41, 42 and 43 therein shown to be six in number, disposed on opposite sides of such compartment, there being provided within the compartment 37 another set of colored lamps 44, 45, 46 and 47 that are connected in circuit with the lamps 38 to 43 inclusive, as hereinafter described.

The signal box 4 is similar to the signal box 5 and is provided with lamps 48, 49, 50, 51, 52 and 53 that correspond to the lamps 38 to 43, inclusive, and with lamps 54, 55, 56 and 57 that correspond to the lamps 44 to 47, inclusive, all of such lamps being shown diagrammatically in Fig. 3, while the signal box 6 is provided with lamps 58, 59, 60, 61, 62 and 63 that correspond in color and relative position with the lamps 38 to 43 in the box 5 and the lamps 48 to 53 in the box 4.

All of the lamps in each of the signal boxes 4, 5 and 6 are connected with one terminal of a battery 64 by an electric circuit wire 65 such wire 65 preferably being provided with a switch 66 by means of which the circuit formed by such wire may be broken, the other terminal of the battery 64 being connected with the cross-arm 24 by a form of connection more clearly illustrated in Fig. 9, and the contact member 28 on the dial 27 being connected with the lamps 45 and 55, which are preferably white lamps, in order that the registration numbers on the signal boxes 4 and 5 may be illuminated with a white light when the car 1 is stopped or is running at a low rate of speed.

The remaining lamps shown in Fig. 3 are connected in the following manner: The lamps 38, 48 and 58 and 44 and 54 which are all of the same color, are connected with the contact member 29 by an electric circuit connector 67; the lamps 40, 46, 50, 56 and 60 are connected with the contact member 30 by connector wire 68; the lamps 42, 47, 52, 57 and 62 are connected with the contact member 31 by connector wire 69; the lamps 39, 49 and 59 are connected with contact member 34 by connector 70; the lamps 41, 51 and 61 are connected with contact member 33 by connector 71 and the lamps 43, 53 and 63 are connected with contact member 32 by connector 72.

The lamps connected with the contact members 29 and 34 are preferably all of the same color as, for instance, green; the lamps connected with the contact members 30 and 33 are all of another color as, for instance, blue, while the lamps connected with the contact members 31 and 32 are all of still another color as, for instance, orange. Thus lights of similar colors are made to show in similar positions on the three signal boxes 4, 5 and 6 simultaneously.

The contact members 29, 30 and 31 are disposed in close proximity to each other so that the roller 25 will pass on to one of said contact members as it passes off of the preceding one, while the contact members 32, 33 and 34 are spaced apart an appreciable distance and are so disposed that the roller 26 will not make contact with the member 34 until the roller 25 has traveled over a substantial part, approximately one-half, of the member 29, and in a similar manner the roller 26 will not make contact with the members 33 and 32 until the roller 25 has traveled over approximately half of the members 30 and 31, respectively.

The numerous lamps embodied in our invention are, preferably, all covered with ground glass cover plates in order that they may not show too brightly and such lamps are mounted in a manner illustrated in Figs. 5 and 8 wherein there is shown a socket 75 that is provided with an angular slot 76 within which a pin 77 on a lamp 78 is adapted to fit to form a bayonet joint by which the lamp 78 is secured within the socket 75, suitable terminals 76 adapted to make electrical contact with the lamp 78 being provided in the bottom of the socket 75 as more clearly shown in Fig. 8.

The lamp 78 and socket 75 are disposed within a bell-shaped fixture or globe 79 that serves as a reflector for the lamp and as a casing for the socket 75 such fixture being provided at its bottom end with an enlarged portion 80 that is disposed between blocks 81 and adapted to fit over an enlarged base portion 82 with which the socket 75 is connected by a pawl 83 that is adapted to project within a slot 84 in such socket, there being pivoted on each of the blocks 81 small retaining members 85 that may be turned inwardly to engage with the enlarged base portion 82 of the fixture 79 to hold such fixture in engagement with a base 86, and the enlarged base portion 82 of the globe 79 being adapted to fit over and engage with the pawl 83 to prevent such pawl from becoming disengaged with the socket 75 as more clearly illustrated in Fig. 8.

When the car 1 is stopped or is moving at a low rate of speed, the roller 25 will be in contact with the member 28 and the white lamps 45 and 55 only will be electrified but as the rate of speed of the car 1 increases, the disk 12 will be caused by centrifugal force, due to the increasing rotary velocity of the shaft 10, to approach a plane at right angles to the length of said shaft 10, thus acting through the link 14 and other connecting mechanism to move the bell-crank shaped member 18 in a contra-clockwise direction and cause such bell-crank shaped member to wipe the cam surface 20 and move the arm 21 and the cross-arm 24 in a clockwise direction about the pivot shaft 22, thus causing the rollers 25 and 26 to roll on the dial 27, the cam surface 20 being so formed that the relation between the speed of the shaft 10 and the angular movement of the bar 21 and cross-bar 24 will be constant.

When the car 1 has attained a certain speed, for instance nine miles per hour, the roller 25 will pass onto the contact member 29, thus closing the circuits formed by the conductor wires 65 and 67 and lighting the green lamps 38, 44, 48, 54 and 58, which lamps remain lighted as long as the roller 25 continues to make contact with the member 29. When the speed of the car increases sufficiently, for instance to thirteen miles per hour, the roller 26 will engage the member 34 and close the circuit formed by the connector wires 65 and 70, thus lighting the green lamps 39, 49 and 59, which lamps, together with the lamps that are connected with the contact member 29, will remain lighted until the car has attained sufficient speed, for instance twenty-one miles per hour, to cause the rollers 25 and 26 simultaneously to break contact with the members 29 and 34 and extinguish the green lamps, the roller 25 passing onto the contact member 30 as soon as it has passed off of the contact member 29 and lighting the blue lamps 40, 45, 50, 55 and 60 and the roller 26 when the car has attained a still greater speed engaging the contact member 33 to light the blue lamps 41, 51 and 61 and such rollers 25 and 26 continuing to move in a similar manner as the speed of the car increases to extinguish the green lamps and light the red lamps 42, 47, 52, 57 and 62 and the orange lamps 43, 53 and 63 at certain predetermined rates of speed.

Obviously, the speed at which the several lamps in each signal box are lighted is arbitrary, but if the mechanism is adjusted for speeds of 9, 13, 21, 25, 35 and 42 miles per hour, then one green lamp is each box will be lighted at a speed of from nine to thirteen miles per hour, two green lamps in each box will be lighted at a speed of from thirteen to twenty-one miles per hour, the green lamps will be extinguished and one blue lamp will show at a speed of twenty-one to twenty-five miles per hour, two blue lamps will show at a speed of twenty-five to thirty-five miles per hour, the blue lamps will be extinguished and one orange lamp will show at a speed of thirty-five to forty-two miles per hour and two orange lamps will show at a speed of more than forty-two miles per hour.

Manifestly the signal lamps need not be associated with the registration number if it is not desired to do so or the lamps within the casing 37 may be eliminated, or numerous other changes may be made without departing from the spirit of our invention.

Having described our invention, what we claim is—

1. A signaling device for motor vehicles, consisting in a signal box inclosing a plurality of colored lamps arranged in pairs of respective colors, electric circuits connected with said lamps, mechanism interposed in said electric circuits and connected with rotative parts of said vehicle to close and to break said circuits to light and extinguish said lamps in response to variations in the rate of travel of said vehicle, said mechanism providing for the illumination of said colored lamps singly or in pairs, said pairs consisting in lamps of a similar color only.

2. A signaling device for motor vehicles, consisting in a signal box inclosing a plurality of colored lamps arranged in pairs of respective colors, said lamps of similar colors being separated by a space whereby their identity can be distinguished, electric circuits connected with said lamps, mechanism interposed in said electric circuits and connected with rotative parts of said vehicle to close and to break said circuits to light and extinguish said lamps in response to variations in the rate of travel of said vehicle, said mechanism providing for the illumination of said colored lamps singly or in pairs, said pairs consisting in lamps of a similar color only.

3. A signaling device for motor vehicles, comprising speedometer mechanism connected with a wheel of a vehicle, a cross-arm connected with said speedometer mechanism and adapted to be moved about a central pivot point thereby, contact rollers provided on the ends of said cross arm, a dial, contact members provided in said dial in the path of said rollers, a signal box embodying a plurality of colored lamps, arranged in pairs with respect to color, associated with the front portion of said vehicle, a similar signal box associated with the rear portion of said car, another signal box associated with said car adjacent a driver's seat in said car, and electric circuit wires connected with said lamps in said signal boxes and with said contact members to electrify corresponding lights in all of said three signal boxes in response to a movement of said contact rollers over said contact members.

4. A signaling device for motor vehicles, comprising speedometer mechanism connected with a vehicle wheel, an arm connected with said speedometer mechanism having contact devices at its opposite ends, a dial, contact members arranged upon opposite sides of said dial over which said arm-contacts are adapted to move to close and break electrical circuits, colored signal lamps associated with the front and rear portion of a vehicle, an electric circuit wire connected with said lamps and with said arm-contacts, and other electric circuit wires connected with certain of said lamps and with certain of said contact members to cause different ones of said lamps to be lighted in response to the presence of said contact arm on different ones of said contact members, the position of said contact arm having a definite relation to the speed of travel of said vehicle.

5. A signaling device for motor vehicles, comprising speedometer mechanism connected with rotatable parts of a vehicle, a contact arm associated with said speedometer mechanism and adapted to be moved thereby in response to a change in the speed of travel of said vehicle, contact members over which said contact arm is adapted to move, said contact members being of different lengths, signal boxes connected with the front and rear portions of the car, said signal boxes each consisting in a compartment with which a registration number may be associated, said compartment having a plurality of colored lamps disposed therein, colored signal lamps disposed on each side of said compartment, and electric circuit wires connecting said lamps with said contact arm and said contact members whereby when lamps of one color outside of said compartment are lighted, lamps of the same color within said compartment may be lighted.

6. In a signaling device of the class described, the combination with a motor vehicle, of pairs of colored lamps, the two lamps of each pair being of the same color and being of a different color from the two lamps of each other pair, a switch associated with speedometer mechanism and with an electric circuit for lighting and extinguishing said lamps, said switch being adapted to light the first lamp of one of said pairs of lamps when said vehicle has attained a predetermined rate of speed of travel, then to light the other one of said first pair of lamps when said vehicle has attained a higher rate of speed, then to extinguish both of the lamps of said first pair simultaneously and to light one lamp of a second pair of lamps when said vehicle has attained a still higher speed and in a similar manner to light and extinguish all of the remaining lamps at successive predetermined rates of speed of travel of said vehicle.

7. A signaling device for motor vehicles consisting in speed-indicating mechanism, a cross-arm connected intermediate its length with said mechanism and having contact devices at its opposite ends, a dial, two groups of contact members arranged in opposed relation in said dial in the path of said arm-contacts, a plurality of electric circuits arranged in parallel, each including one of said contact members and a lamp and adapted to be closed by said cross-arm.

8. A signaling device for motor vehicles, consisting in speed-indicating mechanism, an arm pivotally connected intermediate its ends to said speed-indicating mechanism and having an electrical contact at each of its opposite ends, a dial, electrical contact members on said dial arranged in two opposed groups in the path of said arm-contacts, respectively, whereby said arm may connect with two of said contact members simultaneously, and a plurality of normally open electric circuits each including one of said contact members and a lamp, said circuits being adapted to be closed by said arm either singly or in pairs.

9. A signaling device for motor vehicles, comprising speedometer mechanism connected with a wheel of a vehicle, a cross-arm connected with said speedometer mechanism and adapted to be moved about a central pivot point thereby, contact rollers provided on the ends of said cross arm, a dial, contact members provided in said dial in the path of said rollers, a plurality of signal boxes each embodying a plurality of colored lamps arranged in pairs with respect to color, and electric circuit wires connected with said lamps in said signal boxes and with said contact members to electrify corresponding lights in all of said signal boxes in response to a movement of said contact rollers over said contact members.

ALBERT O. BENSON.
ARY A. BENSON.
GUY MIRL BENSON.
HALDOR K. SOLBERG.

Witnesses:
E. PETERSON,
S. L. REYNOLDS.

CHARLES H. FLICK.
Witnesses for Charles H. Flick:
JOSEPH ASPDEN,
R. H. SMATHERS.